United States Patent
Tanihara

(10) Patent No.: US 7,682,422 B2
(45) Date of Patent: Mar. 23, 2010

(54) METHOD FOR SEPARATING/RECOVERING OXYGEN-RICH AIR FROM AIR, ITS APPARATUS AND GAS SEPARATION MEMBRANE MODULE

(75) Inventor: Nozomu Tanihara, Ube (JP)

(73) Assignee: UBE Industries, Ltd., Ube-shi (JP)

( * ) Notice: Subject to any disclaimer, the term of this patent is extended or adjusted under 35 U.S.C. 154(b) by 616 days.

(21) Appl. No.: 10/590,189

(22) PCT Filed: Feb. 18, 2005

(86) PCT No.: PCT/JP2005/002590

§ 371 (c)(1),
(2), (4) Date: Aug. 17, 2006

(87) PCT Pub. No.: WO2005/079956

PCT Pub. Date: Sep. 1, 2005

(65) Prior Publication Data

US 2007/0180989 A1    Aug. 9, 2007

(30) Foreign Application Priority Data

Feb. 19, 2004    (JP)    ................ 2004-042568

(51) Int. Cl.
*B01D 53/22*    (2006.01)

(52) U.S. Cl. .................. 95/54; 95/45; 96/4; 96/7; 96/9; 96/11; 55/520; 55/524; 55/DIG. 5; 210/640; 210/321.74; 210/321.83; 210/321.85

(58) Field of Classification Search ............ 95/45, 95/54; 96/4, 7, 9, 11; 55/520, 524, DIG. 5; 210/640, 321.74, 321.76, 321.83, 321.85
See application file for complete search history.

(56) References Cited

U.S. PATENT DOCUMENTS

| | | | | |
|---|---|---|---|---|
| 5,061,297 A | * | 10/1991 | Krasberg | ................ 95/54 |
| 5,154,832 A | * | 10/1992 | Yamamura et al. | ......... 210/640 |
| 6,126,721 A | * | 10/2000 | Nemser et al. | ............... 95/54 |
| 6,168,648 B1 | * | 1/2001 | Ootani et al. | ................ 95/45 |
| 6,406,517 B1 | * | 6/2002 | Avery et al. | ................ 95/54 |
| 7,393,388 B2 | * | 7/2008 | Spadaccini et al. | ............. 95/54 |

FOREIGN PATENT DOCUMENTS

| | | |
|---|---|---|
| JP | 62-1405 A | 1/1987 |
| JP | 2-25019 | 2/1990 |
| JP | 02-124702 | 5/1990 |
| JP | 03-028104 | 2/1991 |
| JP | 06-262026 | 9/1994 |

OTHER PUBLICATIONS

Written Opinion of the International Searching Authority for International Application No. PCT/JP2005/002590 dated Sep. 19, 2006 by Japanese Patent Office.

Notice to reasons for refusal for Japanese Application No. 2005-043765 dated Mar. 17, 2009 by Japanese Patent Office.

* cited by examiner

*Primary Examiner*—Jason M Greene
(74) *Attorney, Agent, or Firm*—Knobbe Martens Olson & Bear LLP

(57) ABSTRACT

A method for separating and recovering oxygen-rich air from the air, comprising, using a gas separation membrane module where a laminate consisting of a permeate-side spacer for forming a permeate gas channel communicated with a hollow section in a core tube for collecting and discharging a permeate gas and two flat-film gas separation membranes sandwiching the spacer and a feed-side spacer for forming a feed gas channel are spirally wound around the core tube such that the laminate and the feed-side spacer are alternately superimposed, vacuuming the hollow section of the core tube to 95 kPaA (absolute pressure) or less by vacuuming means while feeding the air into the feed gas channel by air feed means such that a maximum feed-air flow rate and a maximum static pressure divided by an effective membrane area of the gas separation membrane are 100 $m^3/min \cdot m^2$ or less and 4000 $Pa/m^2$ or less, respectively, to separate and recover oxygen-rich air from the hollow section of the core tube. Oxygen-rich air can be separated and recovered from the air by this method with high separation efficiency.

7 Claims, 2 Drawing Sheets

METHOD FOR SEPARATING/RECOVERING OXYGEN-RICH AIR FROM AIR, ITS APPARATUS AND GAS SEPARATION MEMBRANE MODULE

TECHNICAL FIELD

This invention relates to a method for efficiently separating and recovering oxygen-rich air from the air using a spiral type gas separation membrane module where a flat-film gas separation membrane is wound around a core tube. It also relates to a gas separation membrane module having a convenient structure which is suitable for separating and recovering oxygen-rich air from the air.

BACKGROUND ART

A spiral type gas separation membrane module in which a flat-film gas separation membrane is wound around a core tube generally has a configuration where a permeate-side spacer for forming a permeate gas channel is sandwiched between flat-film gas separation membranes, which are adhered to the core tube such that the permeate gas channel communicates with a hollow section in the core tube and are wound around the core tube together with a feed-side spacer for forming a feed gas channel.

Such a spiral type gas separation membrane module has a simple structure and can be easily manufactured, but gives a low concentration of a separated/recovered gas because of a lower separation efficiency in comparison with a hollow fiber type gas separation membrane module. It has not been, thus, necessarily preferentially used in practice.

Japanese laid-open patent publication No. 6-262026 has disclosed that in a spiral type gas separation membrane module for separating the air, a permeate gas channel is gradually made thicker from the initiation to the end of winding in order to prevent performance deterioration due to a pressure loss. However, this separation membrane module is provided for separating and recovering highly enriched nitrogen by feeding a pressurized air. The publication has not disclosed a method for separating and recovering oxygen-rich air from the air where a feed side is substantially at atmospheric pressure while a permeate side is under reduced pressure.

Separation and recovery of oxygen-rich air from the air using a gas separation membrane module inevitably involves discharge of nitrogen-rich air. In a method where a pressurized air is fed to a gas separation membrane module, oxygen-rich air at substantially atmospheric pressure is obtained in a permeate side while nitrogen-rich air under high pressure is obtained in a non-permeate side. That is, in the method of feeding pressurized air, nitrogen-rich air which is resultantly co-produced must be compressed as a feed air. Nitrogen is contained about four times as much as oxygen in the air. Therefore, in the light of an energy for compressing the nitrogen-containing feed air, the method of feeding pressurized air is energetically considerably inefficient and disadvantageous. Furthermore, for applying pressure to the feed side in the spiral type gas separation membrane module, the separation membrane module must be placed in a pressure-resistant vessel having nozzles of a feed side, a non-permeate side and a permeate side, or alternatively at least the outermost part of the separation membrane module must be of an adequately pressure-resistant structure or member. In addition, pressure regulating means such as a valve must be disposed at a given position in a gas channel for maintaining a feed-side pressure. Thus, the method requires extra components and/or structures.

LIST OF REFERENCES

Patent document 1: Japanese laid-open patent publication No. 6-262026

DISCLOSURE OF INVENTION

Problems to be Solved by the Invention

An objective of the present invention is to provide a method for efficiently separating and recovering oxygen-rich air from the air using a spiral type gas separating membrane module and a spiral type gas separation membrane module which can be suitably used for the method for efficiently separating and recovering oxygen-rich air from the air.

Means for Solving the Problems

The present invention provides a method for separating and recovering oxygen-rich air from the air, comprising:
providing a gas separation membrane module where
(i) a laminate comprising a permeate-side spacer for forming a permeate gas channel communicated with a hollow section in a core tube for collecting and discharging a permeate gas and two flat-film gas separation membranes sandwiching the spacer and
(ii) a feed-side spacer for forming a feed gas channel are spirally wound around the core tube such that the laminate and the feed-side spacer are alternately superimposed, vacuuming the hollow section of the core tube to 95 kPaA or less by vacuuming means while feeding the air into the feed gas channel by air feed means such that a maximum feed-air flow rate and a maximum static pressure divided by an effective membrane area of the gas separation membrane are 100 $m^3/min \cdot m^2$ or less and 4000 $Pa/m^2$ or less, respectively, to separate and recover oxygen-rich air from the hollow section of the core tube.

The gas separation membrane module preferably has a plurality of laminates; each of the laminates comprising a permeate-side spacer for forming a permeate gas channel communicated with a hollow section in a core tube for collecting and discharging a permeate gas and two flat-film gas separation membranes sandwiching the spacer; and the laminates being spirally wound around the core tube together with a feed-side spacer for forming a feed gas channel such that the laminate and the feed-side spacer are alternately superimposed.

In the gas separation membrane module, a thickness ratio of the permeate-side spacer to the feed-side spacer is preferably 1:2 to 1:10.

The present invention also provides a gas separation membrane module having a plurality of laminates; each of the laminates comprising a permeate-side spacer for forming a permeate gas channel communicated with a hollow section in a core tube for collecting and discharging a permeate gas and two flat-film gas separation membranes sandwiching the spacer; wherein the laminates are spirally wound around the core tube together with a feed-side spacer for forming a feed gas channel such that the laminate and the feed-side spacer are alternately superimposed, wherein a thickness ratio of the permeate-side spacer to the feed-side spacer is 1:2 to 1:10, and wherein the module is used for separating and recovering oxygen-rich air from a hollow section by vacuuming the hollow section while feeding the air to a feed gas channel.

Effect of the Invention

According to the present invention, a simple spiral type gas separation membrane module can be used to efficiently separate and recover oxygen-rich air from the air.

Figure 1:
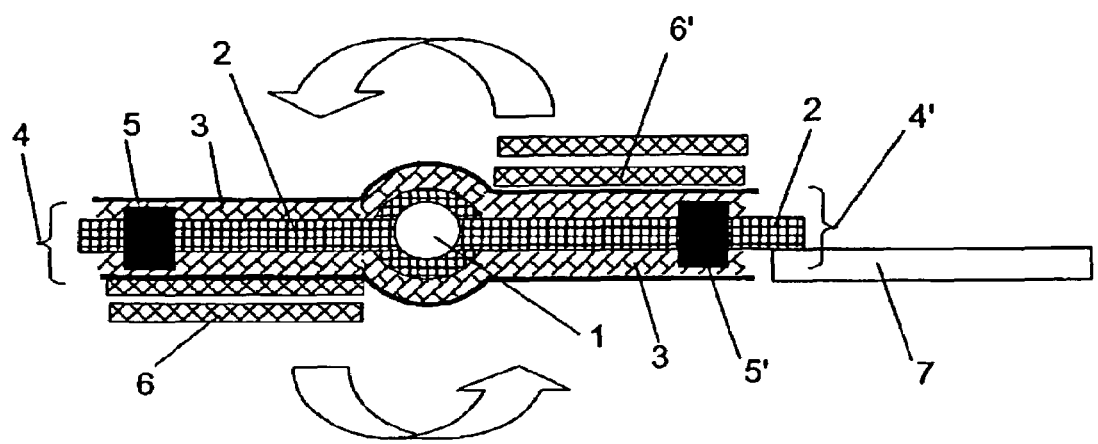
FIG. 1 is a schematic cross-sectional development of an example of a gas separating membrane module according to the present invention.

In the drawings, the symbols have the following meanings; 1: core tube, 2: permeate-side spacer, 3: flat-film gas separation membrane, 4, 4': laminate having a permeate-side spacer sandwiched between two flat-film gas separation membrane, 5, 5': adhesive, 6, 6': feed-side spacer (in the drawings, two spacers are shown), 7: outer film, 10: separation membrane module, 11: fan, 12: cover (case), 13: vacuum pump, 14: pressure gauge, and 15: buffer tank.

BEST MODE FOR CARRYING OUT THE INVENTION

After our intense investigation on a method for separating and recovering oxygen-rich air from the air using a spiral type separation membrane module having a simple structure, the present invention has been achieved on the basis of our observation that oxygen-rich air can be considerably efficiently separated and recovered by feeding the air at substantially atmospheric pressure and at a given feed-air flow rate per an effective membrane area to a spiral type gas separation membrane module while vacuuming permeate side of the gas separation membrane to a given pressure.

A gas separation membrane module used in this invention is of a spiral type. Specifically, it has a configuration that a laminate consisting of a permeate-side spacer for forming a permeate gas channel communicated with a hollow section in a core tube for collecting and discharging a permeate gas and two flat-film gas separation membranes sandwiching the spacer and a feed-side spacer for forming a feed gas channel are spirally wound around the core tube such that the laminate and the feed-side spacer are alternately superimposed.

Figure 2:
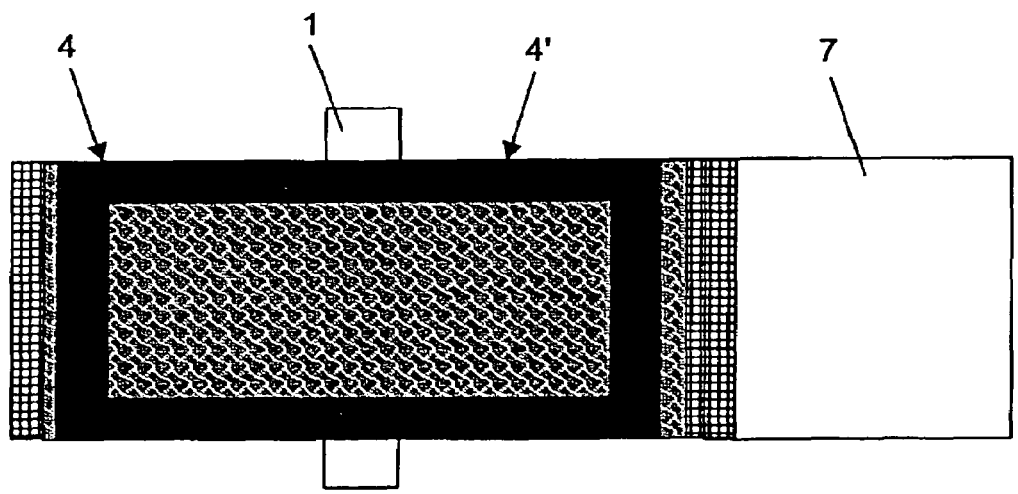
FIG. 2 is a schematic plan view of the cross-sectional development in FIG. 1.

FIG. 1 shows a schematic cross-section when an example of a gas separation membrane module of the present invention is developed. A core tube 1 has a hollow section and serves to collect a permeate gas and discharge the gas outside of the module. Laminates 4,4' having a permeate-side spacer 2 sandwiched between two flat-film gas separation membranes 3 extend in both sides of the core tube. Inside of each of the laminates 4,4', the permeate-side spacer 2 forms a permeate gas channel which is communicated with the hollow section in the core tube 1. The permeate gas channel formed by the permeate-side spacer 2 in the laminates 4,4' is sealed at the peripheral edges of the laminate 4,4' by adhesives 5,5' and isolated from the outer space by the flat-film gas separation membrane 3 except an opening communicated with the hollow section in the core tube 1. Feed-side spacers 6,6' which form a feed gas channel are disposed on these laminates 4,4' as shown in FIG. 1, and these are spirally wound around the core tube 1 such that they are alternately superimposed. The winding direction is indicated by an arrow in FIG. 1. An outer film 7 that is substantially gas-impermeable is wound over the outermost layer of the winding. The feed-side spacers 6,6' are fixed by the laminates 4,4' and the outer film 7 except the ends in the longitudinal direction of the core tube 1. As a result, the feed gas channel is opened only around the ends in the longitudinal direction of the core tube 1 and the permeate gas channel is communicated with the hollow section in the core tube 1, and these channels form mutually isolated spaces across the flat-film gas separation membrane 3. FIG. 2 is a schematic plan view of the cross-section of FIG. 1.

In the method and the apparatus of the present invention, the air is fed to the feed gas channel from one of the openings at the ends of the feed gas channel in the longitudinal direction of the core tube and discharged from the other opening. Flowing through the feed gas channel, the air is in contact with the separation membrane, during which oxygen gas in the air selectively permeates the gas separation membrane by a pressure difference between the feed and the permeate sides. Thus, oxygen-rich air with a higher concentration of oxygen which has selectively permeated flows through the permeate gas channel, enters the hollow section in the core tube and then is discharged outside of the module.

In this invention, the air can be fed to the feed gas channel using a simple air blower such as a fan rather than a pressurized air by a compressor as in the prior art. Air feeding means has a capacity such that the maximum feed-air flow rate per an effective membrane area (hereinafter, optionally simply referred to as "a membrane area") of the gas separation membrane is 100 $m^3/min·m^2$ or less, preferably 10 $m^3/min·m^2$ or less, particularly preferably 4 $m^3/min·m^2$ or less while the maximum static pressure of the air feeding means per an effective membrane area of the gas separation membrane is 4000 $Pa/m^2$ or less, preferably 600 $Pa/m^2$ or less, particularly preferably 150 $Pa/m^2$ or less. That is, since the air is fed into the feed gas channel (feed-side spacer) by such air feeding means with a relatively lower air-feeding capacity, air pressure within the feed gas channel at operation is substantially atmospheric pressure. Therefore, in the feed-side spacer constituting the feed gas channel, a pressure loss must be so small that such air feeding means can feed the air. Specifically, a pressure loss in the feed gas channel per a membrane area must be less than 4000 $Pa/M^2$, preferably less than 600 $Pa/m^2$, more preferably 150 $Pa/m^2$ or less.

It is energetically disadvantageous and undesirable to use air feeding means in which the maximum feed-air flow rate per an effective membrane area of the gas separation membrane is more than 100 $m^3/min·m^2$ and the maximum static pressure per an effective membrane area is more than 4000 $Pa/m^2$, because a machine with a lower air-feeding power such as a fan and a blower cannot meet the requirements and thus a machine with a high power such as a compressor must be used.

On the other hand, the air must be fed at a predetermined feed-air flow rate for preventing an oxygen partial pressure from being lowered on the separation membrane surface. Preferably, the air is fed at such a feed-air flow rate that an oxygen concentration in the discharged air from the feed side is maintained at more than 1%.

The air feeding means may be any of those in which the maximum static pressure is within the above range without particular restrictions, suitably including a fan and a blower. These can feed the air at substantially atmospheric pressure. In this invention, the air feeding means may be of a suction or blowing-in type.

On the other hand, in the permeate side, the hollow section in the core tube can be vacuumed by vacuuming means to 95 kPaA or less, particularly 60 kPaA or less, to separate and recover oxygen-rich air from the hollow section in the core tube. If an ultimate pressure as an indicator of a capacity of the vacuuming means is lower, the more effective oxygen enrichment is attained. However, for avoiding scale-up of the vacuuming means, the ultimate pressure may be, for example, 20 PaA or higher, and for example, even 35 PaA or higher is adequate. There are no restrictions to the type of vacuuming means as long as it can perform vacuuming to a given pressure; common vacuum pumps can be suitably used. When using a vacuum pump, oxygen-rich air is recovered from an outlet of the vacuum pump.

As described above, for recovering oxygen-rich air from the air by a pressure difference between the feed and the permeate sides in the gas separation membrane module which oxygen can selectively permeate, a method of feeding pressurized air is energetically considerably inefficient and disadvantageous because resultantly co-produced nitrogen-rich air is also compressed as a feed air. Furthermore, for applying pressure to the feed side in the spiral type gas separation membrane module, the separation membrane module must be placed in a pressure-resistant vessel having nozzles of a feed side, a non-permeate side and a permeate side, or alternatively at least the outermost part of the separation membrane module must be of an adequately pressure-resistant structure or member, and additionally, pressure regulating means such as a valve must be disposed at a given position in a gas channel for maintaining a feed-side pressure. Thus, the method requires extra components and/or structures.

In contrast, the method of the present invention where the air is fed to the feed side at substantially atmospheric pressure while vacuuming the permeate side is energetically extremely effective and advantageous because only desired oxygen-rich air can be vacuumed. Furthermore, it can eliminate the necessity of placing the separation membrane module in a pressure-resistant vessel having nozzles of a feed side, a non-permeate side and a permeate side, or of using an adequately pressure-resistant structure or member for the outermost part of the separation membrane module and thus of disposing pressure regulating means such as a valve at a given position in a gas channel for maintaining a feed-side pressure. It, therefore, allows the spiral type separation membrane module to be of a very convenient and simple structure.

In the method where the convenient spiral type separation membrane module is used to feed the air at substantially atmospheric pressure to the feed side while vacuuming the permeate side, it is extremely important to reduce a resistance of the feed gas channel in the gas separation membrane module where the air fed at substantially atmospheric pressure flows, for improving a separation efficiency. Of course, since a separation efficiently can be improved when the permeate side is more largely vacuumed, a structure where a resistance of the permeate gas channel is smaller is desirable.

In the method and the apparatus of the prevent invention, it is preferable to use a gas separation membrane module having a plurality of laminates, preferably about 2 to 8 laminates, particularly 2 to 4 laminates, wherein each of the laminates includes a permeate-side spacer for forming a permeate gas channel communicated with a hollow section in a core tube for collecting and discharging a permeate gas and two flat-film gas separation membranes sandwiching the spacer, and wherein the laminates are spirally wound around the core tubes together with a feed-side spacers for forming feed gas channel such that the laminates and the feed-side spacers are alternately superimposed. In the configuration having a plurality of laminates, a separation efficiency is higher than that having one laminate with the same effective membrane area. When winding with one laminate, a permeate gas channel in the laminate may be relatively longer and a pressure loss of the channel is higher, when vacuumed, which leads to reduction in a separation efficiency.

Furthermore, a thickness ratio of the permeate-side spacer to the feed-side spacer in a gas separation membrane module used is preferably 1:2 to 1:10, particularly preferably 1:3 to 1:9, further preferably 1:4 to 1:7 for improving a separation efficiency. The thicknesses of these spacers define the size of a space of the permeate gas channel and that of the feed gas channel. Therefore, in this invention, a space in the feed gas channel where the air flows at substantially atmospheric pressure is 2 to 10 times, particularly 3 to 9 times, further 4 to 7 times as large as a space in the permeate gas channel which is vacuumed. If the feed-side spacer has a thickness of less than two-fold of a thickness of the permeate-side spacer, a separation efficiency is not easily improved. If a thickness of the feed-side spacer is larger than 10-fold of a thickness of the permeate-side spacer, a separation efficiency is improved, but is saturated and is not correspondingly improved, and the separation membrane module becomes large, which reduces compactness. A spacer "thickness" as used herein refers to a space size of the channels as described above. Thus, when using two feed-side spacers as illustrated in FIG. 1, a spacer thickness is the total thickness of two spacers. In the light of a pressure loss and the like, a thickness of the feed-side spacer itself is important, and is for example 0.6 mm or more, preferably 0.9 mm or more, more preferably 1.2 mm or more. In the light of compactness and easiness of forming a module by spirally winding a laminate consisting of, for example, a separation membrane, a permeate-side spacer and a feed-side spacer, the thickness is preferably 10 mm or less, more preferably 5 mm or less, particularly preferably 3 mm or less.

A separation membrane module of the present invention is a separation membrane module particularly suitably used for a method for separating and recovering oxygen-rich air from the air as described above. The separation module has a plurality of laminates, each of which comprises a permeate-side spacer for forming a permeate gas channel communicated with a hollow section in a core tube for collecting and discharging a permeate gas and two flat-film gas separation membranes sandwiching the spacer, and the laminates are spirally wound around the core tube together with a feed-side spacer for forming a feed gas channel such that the laminate and the feed-side spacer are alternately superimposed, wherein a thickness ratio of the permeate-side spacer to the feed-side spacer is 1:2 to 1:10.

Although there are no particular restrictions to a gas separation membrane as long as it is a flat-film membrane which oxygen gas can selectively permeate in comparison with nitrogen gas, it is preferable that an oxygen gas permeation rate at 25° C. is $1 \times 10^{-4}$ cm$^3$(STP)/cm$^2$·sec·cmHg or more and a permeation rate ratio of oxygen gas/nitrogen gas ($P'_{O2}/P'_{N2}$) is 1.5 or more. A suitable example may be an asymmetric composite separation membrane manufactured by laminating a porous layer made of polymers such as polyetherimide and polyvinylidene fluoride and a separating layer made of a silicone rubber on an unwoven fabric substrate made of a polymer such as polyethylene terephthalate and cellulose.

The core tube has a hollow section, an opening for communicating the hollow section with a permeate gas channel and an opening for discharging a permeate gas from the hollow section. The opening for communicating the hollow section with the permeate gas channel may be a groove or a plurality of aligned holes. There are no particular restrictions to the opening for discharging a permeate gas from the hollow section, but it is generally one or both of the open ends of the core tube. The core tube must have strength to a certain extent because it serves as a core rod in spirally winding a separation membrane, a permeate-side spacer, and a feed-side spacer. Thus, it is suitably made of a polymer or metal. It is suitably, but not limited to, cylindrical.

The feed-side spacer and the permeate-side spacer are used for forming the feed gas channel and the permeate gas channel as a space. They may be, without limitations, any of those which provide a space having a certain thickness through which a gas can flow when their spacers are sandwiched by membranes. They may be, for example, suitably selected from meshes of a polymer such as polyolefins, polyesters and Nylons and porous materials having penetration holes. For avoiding a pressure loss, sizes of a mesh opening and of a penetration hole are preferably as large as possible within a range where their shape can be maintained; for example, suitably, a fabric or textile mesh formed using threads having a wire diameter of about 0.02 to 3 mm.

The outer film is disposed on the outermost surface of the spiral winding for separating the inner part from the outer part, and may be, for example, polyethylene, polypropylene, polyesters or Nylons with a thickness of about 0.1 to 3 mm through which gases are substantially impermeable. It is particularly preferably a film having an adhesive in one side. Alternatively, a cylindrical film may be used such that it covers the outermost surface of the spiral winding. In the gas separation membrane module of the present invention, an adhesive is used for sealing the periphery of the laminate. It may be suitably selected from, for example, polyurethane and epoxy resin adhesives.

Next, specific examples of separation and recovery of oxygen-rich air from the air will be more specifically described with reference to the schematic view in FIG. 3.

Figure 3:
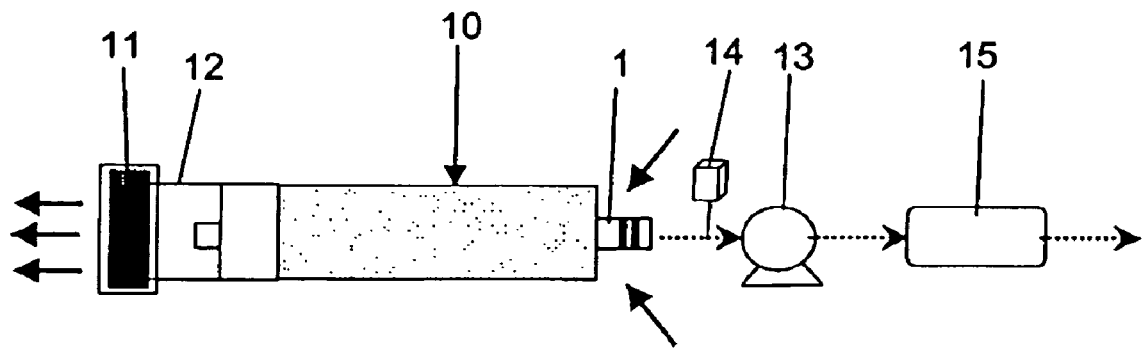
FIG. 3 schematically illustrates a specific example of a method for separating and recovering oxygen-rich air from the air using a separation membrane module of the present invention.

In FIG. 3, a fan 11 and a cover (case) 12 are disposed at one end of the separation membrane module 10 in the longitudinal direction and the air is sucked in the direction of the solid-line arrow. The sucking rate is preliminarily determined, and the air is fed from the opening of the feed gas channel at the end opposite to the end where the fan 11 is connected in the separation membrane module 10, at such a rate that a feed-air flow rate per an effective membrane area in the separation membrane module 10 is 100 m$^3$/min·m$^2$ or less and a static pressure per an effective membrane area is 4000 Pa/m$^2$ or less. The end of the core tube 1 in the side where the fan 11 is disposed in the separation membrane module 10 is sealed. The end of the core tube 1 opposite to the end where the fan 11 is disposed in the separation membrane module 10 is connected to a vacuum pump 13 and a vacuum level is determined by a pressure gauge 14. From the outlet of the vacuum pump 13, oxygen-rich air is discharged in the direction of the broken-line arrow and separated and recovered, if necessary, via a buffer tank 15.

EXAMPLES

This invention will be more specifically described with reference to Examples. It will be, however, appreciated that this invention is not limited to these examples.

Reference Example 1

The following parts and materials were provided: an asymmetric composite separation membrane as a flat-film gas separation membrane with a thickness of 0.15 mm consisting of a polyethylene terephthalate unwoven fabric (substrate) coated by a porous polyetherimide film and then a silicone rubber separation layer having 8×10$^{-4}$ cm$^3$ (STP)/ cm$^2$·sec·cmHg of an oxygen gas permeation rate at 25° C. and 1.8 of a permeation rate ratio of oxygen to nitrogen as an indicator of separation performance; a preformed polyethylene mesh with a thickness of 0.5 mm (one sheet) as a feed-side spacer; a preformed polyethylene terephthalate mesh with a thickness of 0.5 mm as a permeate-side spacer; an ABS resin cylinder as a core tube with a length of 298 mm and an outer diameter of 17.2 mm having a hollow section inside with an inner diameter of 9.5 mm whose one end was sealed and another end was opened, and having 12 holes with inner diameter of 2.85 mm that communicate the hollow section to the outside; and a polyethylene film with a thickness of 1.5 mm as an outer film which contained an adhesive in one side. The permeate-side spacer was sandwiched between the flat-film gas separation membranes to obtain a set of laminate (one laminate with a width of 264 mm, a length from the core tube of 650 mm and a total film length (the front and the back together) of 1300 mm). The end portion of the laminate was attached to the core tube such that the permeate gas channel was communicated with the hollow section in the core tube, and the feed-side spacer was spirally wound around the core tube such that they are alternately superimposed, to form a spiral type separation membrane module with an effective membrane area of 0.2 m$^2$.

The separation membrane module was used as shown in FIG. 3 to separate and recover oxygen-rich air. A fan used had a capacity of a maximum feed-air flow rate of 0.9 m$^3$/min and a maximum static pressure of 25 Pa. A vacuum pump used had an evacuation speed of 14 L/min and an ultimate pressure of 24 kPaA. A buffer tank used was a cylindrical tank with an internal diameter of 42 mm and a length of 440 mm. With this system, a flow rate and an oxygen concentration of oxygen-rich air discharged through the buffer tank were determined. A flow rate was measured by a floating flow meter and an oxygen concentration was measured by a zirconia type oxygen analyzer.

The results are shown in Table 1. In this example, a thickness ratio of the permeate-side spacer to the feed-side spacer was 1:1 and an oxygen concentration in the recovered gas was 21%. That is, oxygen-rich air was not obtained. Oxygen enrichment was not achieved probably because a small thickness of the feed-side spacer led to a large pressure loss and the actual air-feed flow rate was small.

Example 1

Oxygen-rich air was separated and recovered as described in Reference Example 1, except that a preformed polyethylene mesh with a thickness of 1.5 mm was used as a feed-side spacer. The results are shown in Table 1. A thickness ratio of the permeate-side spacer to the feed-side spacer was 1:3, and an oxygen concentration in the recovered gas was 24%. That is, oxygen-rich air was efficiently obtained.

Example 2

Oxygen-rich air was separated and recovered as described in Example 1, using two laminates formed by sandwiching the permeate-side spacer between the flat-film gas separation membranes (two laminates with a width of 264 mm, a length from the core tube of 325 mm and a total film length (the front and the back together) of 650 mm). The results are shown in Table 1. A thickness ratio of the permeate-side spacer to the feed-side spacer was 1:3 and two laminates were used, and an oxygen concentration in the recovered gas was 25%. That is, oxygen-rich air was obtained more efficiently than Example 1.

Reference Example 2

The following parts and materials were provided: an asymmetric composite separation membrane as a flat-film gas separation membrane with a thickness of 0.15 mm consisting of a polyethylene terephthalate unwoven fabric (substrate) coated by a porous polyetherimide film and then a silicone rubber separation having $8 \times 10^{-4}$ cm$^3$ (STP)/cm$^2$·sec·cmHg of an oxygen gas permeation rate at 25° C. and 1.8 of a permeation rate ratio of oxygen to nitrogen as an indicator of separation performance; a preformed polyethylene mesh with a thickness of 0.5 mm as a feed-side spacer; a preformed polyethylene terephthalate mesh with a thickness of 0.5 mm as a permeate-side spacer; an ABS resin cylinder as a core tube with a length of 298 mm and an outer diameter of 17.2 mm having a hollow section inside with an inner diameter of 9.5 mm whose one end was sealed and another end was opened, and having 12 holes with inner diameter of 2.85 mm that communicate the hollow section to the outside; and a polyethylene film with a thickness of 1.5 mm as an outer film which contained an adhesive in one side. The permeate-side spacers were sandwiched between the flat-film gas separation membranes to obtain two set of laminates (two laminates with a width of 264 mm, a length from the core tube of 425 mm and a total film length (the front and the back together) of 850 mm). The end portions of the laminate were attached to the core tube such that the permeate gas channels were communicated with the hollow section in the core tube, and the feed-side spacers were spirally wound around the core tube such that they are alternately superimposed, to form a spiral type separation membrane module with an effective membrane area of 0.3 m$^2$.

Using this separation membrane module, oxygen-rich air was separated and recovered as described in Reference Example 1. The results are shown in Table 1. In this example, a thickness ratio of the permeate-side spacer to the feed-side spacer was 1:1. An oxygen concentration in the recovered gas was 21%. That is, oxygen-rich air was not obtained. Oxygen enrichment was not achieved probably because a small thickness of the feed-side spacer led to a large pressure loss and the actual air feed flow rate is small.

Example 3

Oxygen-rich air was separated and recovered as described in Reference Example 1, except that two sheets in piles of preformed polyethylene mesh with a thickness of 1.5 mm are used as the feed-side spacers. The results are shown in Table 1. A thickness ratio of the permeate-side spacer to the feed-side spacer was 1:6. An oxygen concentration in the recovered gas was 26%. That is, oxygen-rich air was efficiently obtained.

Example 4

Oxygen-rich air was separated and recovered as described in Reference Example 1, except that three sheets in piles of preformed polyethylene mesh with a thickness of 1.5 mm are used as the feed-side spacers. The results are shown in Table 1. A thickness ratio of the permeate-side spacer to the feed-side spacer was 1:9. An oxygen concentration in the recovered gas was 27%. That is, oxygen-rich air was efficiently obtained.

Example 5

The following parts and materials were provided: an asymmetric composite separation membrane as a flat-film gas separation membrane with a thickness of 0.15 mm consisting of a polyethylene terephthalate unwoven fabric (substrate) coated by a porous polyetherimide film and then a silicone rubber separation layer having $1.6 \times 10^{-3}$ cm$^3$(STP)/cm$^2$·sec·cmHg of an oxygen gas permeation rate at 25° C. and 1.8 of a permeation rate ratio of oxygen to nitrogen as an indicator of separation performance; a preformed polyethylene mesh with a thickness of 2.2 mm as a feed-side spacer; a preformed polyethylene terephthalate mesh with a thickness of 1.0 mm as a permeate-side spacer; an ABS resin cylinder as a core tube with a length of 298 mm and an outer diameter of 17.2 mm having a hollow section with an inner diameter of 9.5 mm whose one end was sealed and the other end was opened, and having 12 holes with an inner diameter of 2.85 mm that communicate the hollow section to the outside; and a polyethylene film with a thickness of 1.5 mm as an outer film which contained an adhesive in one side. The permeate-side spacer was sandwiched between the flat-film gas separation membranes to obtain a set of laminate (one laminate with a width of 264 mm, a length from the core tube of 425 mm and a total film length (the front and the back together) of 830 mm). The end portion of the laminate was attached to the core tube such that the permeate gas channel was communicated with the hollow section in the core tube, and the feed-side spacer was spirally wound around the core tube such that they are alternately superimposed, to form a spiral type separation membrane module with an effective membrane area of 0.17 m$^2$.

Using this separation membrane module, oxygen-rich air was separated and recovered as described in Reference Example 1. The results are shown in Table 1. In this example, a thickness ratio of the permeate-side spacer to the feed-side spacer was 1:2.2. An oxygen concentration in the recovered gas was 26%. That is, oxygen-rich air was efficiently obtained.

Example 6

Oxygen-rich air was separated and recovered as described in Reference Example 1, except that the separation membrane module was as described in Example 5 and the fan had a capacity of a maximum feed-air flow rate of 0.4 m$^3$/min and a maximum static pressure of 93 Pa. The results are shown in Table 1. An oxygen concentration in the recovered gas was 27%. That is, oxygen-rich air was efficiently obtained.

Table 1 shows the above results and Table 2 summarizes a power of the fan used in each Example.

TABLE 1

| | Separation membrane module | | | Separation/recovery of oxygen-rich air | |
|---|---|---|---|---|---|
| | Effective membrane area (m²) | The number of laminates consisting of permeate-side spacer and separation membrane | Thickness ratio of a permeate-side to feed-side spacers | Amount of oxygen-rich air (NL/min) | Oxygen concentration in oxygen-rich air (%) |
| Ref. Ex. 1 | 0.20 | 1 | 1:1 | 3.1 | 21 |
| Ex. 1 | 0.20 | 1 | 1:3 | 3.2 | 24 |
| Ex. 2 | 0.20 | 2 | 1:3 | 3.4 | 25 |
| Ref. Ex. 2 | 0.30 | 2 | 1:1 | 4.1 | 21 |
| Ex. 3 | 0.30 | 2 | 1:6 | 4.2 | 26 |
| Ex. 4 | 0.30 | 2 | 1:9 | 4.2 | 27 |
| Ex. 5 | 0.17 | 1 | 1:2.2 | 4.6 | 26 |
| Ex. 6 | 0.17 | 1 | 1:2.2 | 4.6 | 27 |

TABLE 2

| | Fan used | | Maximum feed-air flow rate per an effective membrane area (m³/min · m²) | Maximum static pressure per an effective membrane area (Pa/m²) |
|---|---|---|---|---|
| | Maximum feed-air flow rate (m³/min) | Maximum static pressure (Pa) | | |
| Ref. Ex. 1 | 0.9 | 25 | 4.5 | 125 |
| Ex. 1 | 0.9 | 25 | 4.5 | 125 |
| Ex. 2 | 0.9 | 25 | 4.5 | 125 |
| Ref. Ex. 2 | 0.9 | 25 | 3.0 | 83 |
| Ex. 3 | 0.9 | 25 | 3.0 | 83 |
| Ex. 4 | 0.9 | 25 | 3.0 | 83 |
| Ex. 5 | 0.9 | 25 | 5.3 | 147 |
| Ex. 6 | 0.4 | 93 | 2.4 | 547 |

INDUSTRIAL APPLICABILITY

According to the present invention, a spiral type separation membrane module which has a very convenient structure and can be easily manufactured and a convenient fan or vacuum pump can be combined to efficiently obtain oxygen-rich air.

The invention claimed is:

1. A method for separating and recovering oxygen-rich air from the air, comprising:
   providing a gas separation membrane module where
   (i) a laminate comprising a permeate-side spacer for forming a permeate gas channel communicated with a hollow section in a core tube for collecting and discharging a permeate gas and two flat-film gas separation membranes sandwiching the spacer and
   (ii) a feed-side spacer for forming a feed gas channel are spirally wound around the core tube such that the laminate and the feed-side spacer are alternately superimposed, wherein a thickness ratio of the permeate-side spacer to the feed-side spacer is 1:2 to 1:10; and
   vacuuming the hollow section of the core tube to 95 kPaA or less by vacuuming means while feeding the air into the feed gas channel by a fan or a blower having such a capacity that a maximum feed-air flow rate and a maximum static pressure divided by an effective membrane area of the gas separation membrane are 100 m³/min·m² or less and 4000 Pa/m² or less, respectively, to separate and recover oxygen-rich air from the hollow section of the core tube.

2. The method as claimed in claim 1, wherein the gas separation membrane module has a plurality of laminates; each of the laminates comprising a permeate-side spacer for forming a permeate gas channel communicated with a hollow section in a core tube for collecting and discharging a permeate gas and two flat-film gas separation membranes sandwiching the spacer; wherein the laminates are spirally wound around the core tubes together with feed-side spacers for forming feed gas channel such that the laminates and the feed-side spacers are alternately superimposed.

3. The method as claimed in claim 1, wherein the air flowing in the feed gas channel has substantially atmospheric pressure.

4. An apparatus for separating and recovering oxygen-rich air, comprising:
   (a) a gas separation membrane module where
      (i) a laminate comprising a permeate-side spacer for forming a permeate gas channel communicated with a hollow section in a core tube for collecting and discharging a permeate gas and two flat-film gas separation membranes sandwiching the spacer and
      (ii) a feed-side spacer for forming a feed gas channel are spirally wound around the core tube such that the laminate and the feed-side spacer are alternately superimposed, wherein a thickness ratio of the permeate-side spacer to the feed-side spacer is 1:2 to 1:10;
   (b) a fan or a blower for feeding the air into the feed gas channel, the fan or the blower having such a capacity that a maximum feed-air flow rate and a maximum static pressure divided by an effective membrane area of the gas separation membrane are 100 m³/min·m² or less and 4000 Pa/m² or less, respectively; and
   (c) vacuuming means whereby the hollow section of the core tube is vacuumed to 95 kPaA or less to separate and recover oxygen-rich air from the hollow section of the core tube.

5. The apparatus as claimed in claim 4, wherein the gas separation membrane module has a plurality of laminates; each of the laminates comprising a permeate-side spacer for forming a permeate gas channel communicated with a hollow section in a core tube for collecting and discharging a permeate gas and two flat-film gas separation membranes sandwiching the spacer; wherein the laminates are spirally wound around the core tubes together with feed-side spacers for forming feed gas channel such that the laminates and the feed-side spacers are alternately superimposed.

6. The apparatus as claim 4, wherein the fan or blower, and the feed-side spacer are adapted to allow the air with substantially atmospheric pressure to flow in the feed gas channel.

7. A gas separation membrane module, comprising:

a plurality of laminates; each of the laminates comprising a permeate-side spacer for forming a permeate gas channel communicated with a hollow section in a core tube for collecting and discharging a permeate gas and two flat-film gas separation membranes sandwiching the spacer; wherein the laminates are spirally wound around the core tubes together with feed-side spacers for forming feed gas channel such that the laminates and the feed-side spacers are alternately superimposed, wherein a thickness ratio of the permeate-side spacer to the feed-side spacer is 1:2 to 1:10, and wherein the feed-side spacer is adapted to allow air to flow in the feed gas channel with substantially atmospheric pressure when the air is fed by a fan or a blower having such a capacity that a maximum feed-air flow rate and a maximum static pressure divided by an effective membrane area of the gas separation membrane are 100 $m^{3}/min\ m^{2}$ or less and 4000 $Pa/m^{2}$ or less, respectively, whereby the module separates and recovers oxygen-rich air from a hollow section by vacuuming the hollow section while feeding the air to a feed gas channel.

* * * * *